United States Patent
Oh

(10) Patent No.: US 7,477,480 B2
(45) Date of Patent: Jan. 13, 2009

(54) DISK SPACER, HARD DISK DRIVE WITH THE DISK SPACER, AND DISK BALANCING METHOD USING THE DISK SPACER

(75) Inventor: Young-rok Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 434 days.

(21) Appl. No.: 11/416,135

(22) Filed: May 3, 2006

(65) Prior Publication Data

US 2007/0025016 A1  Feb. 1, 2007

(30) Foreign Application Priority Data

Jul. 26, 2005  (KR) .................. 10-2005-0067833

(51) Int. Cl.
  *G11B 17/08*  (2006.01)
(52) U.S. Cl. ................................... 360/98.08
(58) Field of Classification Search ............. 360/98.08, 360/99.05, 99.12, 71, 75
See application file for complete search history.

(56) References Cited

U.S. PATENT DOCUMENTS

| 6,288,867 | B1* | 9/2001 | Jierapipatanakul et al. ............... 360/98.08 |
| 6,947,244 | B2* | 9/2005 | Kawaguchi et al. ........... 360/75 |
| 2004/0095669 | A1* | 5/2004 | Yoo et al. ..................... 360/71 |
| 2006/0002013 | A1* | 1/2006 | Chan et al. ............... 360/99.12 |
| 2006/0044676 | A1* | 3/2006 | Ueda et al. ............... 360/98.08 |

FOREIGN PATENT DOCUMENTS

| JP | 05-159508 | 6/1993 |
| JP | 6-342578 | 12/1994 |
| JP | 11-134840 | 5/1999 |
| JP | 2004-310980 | 11/2004 |
| KR | 2001-102020 | 11/2001 |

* cited by examiner

*Primary Examiner*—Tianjie Chen
(74) *Attorney, Agent, or Firm*—Staas & Halsey LLP

(57) ABSTRACT

A disk spacer interposed between a plurality of disks that are rotatably installed on a spindle motor and has a ring shape to maintain an interval between the disks. The center of an inner circle defined by an inner circumferential surface of the disk spacer is not congruous with the center of an outer circle defined by an outer circumferential surface thereof to produce mass eccentricity.

14 Claims, 4 Drawing Sheets

DISK SPACER, HARD DISK DRIVE WITH THE DISK SPACER, AND DISK BALANCING METHOD USING THE DISK SPACER

CROSS-REFERENCE TO RELATED PATENT APPLICATION

This application claims the benefit of Korean Patent Application No.10-2005-0067833, filed on Jul. 26, 2005, in the Korean Intellectual Property Office, the disclosure of which is incorporated herein by reference.

BACKGROUND OF THE INVENTION

1. Field of the Invention

The present invention relates to a hard disk drive, and more particularly, to a disk spacer having a mass eccentricity used for disk balancing, a hard disk drive having the disk spacer, and a disk balancing method using the disk spacer.

2. Description of Related Art

Hard disk drives are one known type of auxiliary memory device for a computer. Hard disk drives reproduce information stored on a magnetic disk using a magnetic head and record information on the magnetic disk.

FIG. 1 is a cross-sectional view of a conventional hard disk drive. Referring to FIG. 1, a hard disk drive 10 includes a base member 11, a spindle motor 20 installed on the base member 11, first and second disks 22 and 26 which are data recording media inserted around the spindle motor 20 and rotating, and a disk spacer 30 having a ring shape and interposed between the first and second disks 22 and 26 to separate the first disk 22 from the second disk 26 by a predetermined distance.

The disks 22 and 26 are rotated by the spindle motor 20 at a high speed during the operation of the hard disk drive. However, the rotational center 21 of the spindle motor 20, the rotational center 23 of the first disk 22, and the rotational center 27 of the second disk 26 do not accurately match due to allowance existing in the first and second disks 22 and 26 themselves and allowance occurring during an assembly process. When the eccentricity of the first and second disks 22 and 26 is severe, vibration and noise increase during the rotation of the first and second disks 22 and 26 and a positional error signal (PES) property is deteriorated. When the eccentricity increases further, collision between a magnetic head and the disks may occurs.

One way to decrease a degree of the eccentricity of the disks 22 and 26 to reduce the vibration and noise caused due to the rotation is referred to as disk balancing. Conventionally, as shown in FIG. 1, a method of locating a mass center 23 of the first disk 22 and a mass center 27 of the second disk 26 at the opposite positions with respect to a mass center 21 of the spindle motor 20 has been used. However, the method has a problem that the actual effect of disk balancing is insufficient because a degree of the eccentricity of the disk spacer 30 is not considered. Although the degree of the eccentricity of the disk spacer 30 is negligible, if the difference in the mass eccentricity between the first and second disks 22 and 26 is severe, the actual effect of disk balancing cannot be expected.

BRIEF SUMMARY

An aspect of the present invention provides a disk spacer having a mass eccentricity, a hard disk drive having the disk spacer in which disk balancing is achieved, and a disk balancing method using the disk spacer.

According to an aspect of the present invention, a disk spacer is interposed between a plurality of disks that are rotatably installed on a spindle motor and has a ring shape to maintain an interval between the disks, wherein the center of an inner circle defined by an inner circumferential surface of the disk spacer is not congruous with the center of an outer circle defined by an outer circumferential surface thereof to produce mass eccentricity.

The interval between the center of the inner circle and the center of the outer circle may be within 1 mm.

According to another aspect of the present invention, a hard disk drive includes a base member, a spindle motor installed on the base member, a plurality of disks installed on the spindle motor and having mass eccentricity within allowance, and at least a disk spacer interposed between neighboring disks, wherein the disk spacer has a ring shape and the center of an inner circle defined by an inner circumferential surface of the disk spacer is not congruous with the center of an outer circle defined by an outer circumferential surface thereof to produce mass eccentricity, and installation angles between the disks and the disk spacer is set such that a vector sum of the mass eccentricity of the disks and the disk spacer is within a reference value with respect to the rotational center of the spindle motor.

The interval between the center of the inner circle and the center of the outer circle may be within 1 mm.

The reference value of the mass eccentricity may be 100 cm·mg.

A pair of disks and a disk spacer interposed there between may be installed on the spindle motor and the installation angles between the disks and the disk spacer is set to form an imaginary triangle including the rotational center of the spindle motor by connecting the mass eccentricity vectors of the disks and the mass eccentricity vector of the disk spacer.

A pair of disks and a disk spacer interposed there between may be installed on the spindle motor and the installation angles between the disks and the disk spacer is set to form an imaginary straight line passing the rotational center of the spindle motor by connecting the mass eccentricity vectors of the disks and the mass eccentricity vector of the disk spacer.

According to another aspect of the present invention, a disk balancing method includes: installing a plurality of disks and at least one disk spacer on a spindle motor such that the disk spacer having a ring shape and configured to have mass eccentricity as the center of an inner circle defined by an inner circumferential surface of the disk spacer is not congruous with the center of an outer circle defined by an outer circumferential surface thereof is interposed between neighboring disks having mass eccentricity within allowance; and adjusting installation angles between the disks and the disk spacer such that a vector sum of the mass eccentricity of the disks and the disk spacer is within a reference value with respect to the rotational center of the spindle motor.

The reference value of the mass eccentricity may be 100 cm·mg.

A pair of disks and a disk spacer interposed there between may be installed on the spindle motor and the installation angles between the disks and the disk spacer is set to form an imaginary triangle including the rotational center of the spindle motor by connecting the mass eccentricity vectors of the disks and the mass eccentricity vector of the disk spacer.

A pair of disks and a disk spacer interposed there between may be installed on the spindle motor and the installation angles between the disks and the disk spacer is set to form an imaginary straight line passing the rotational center of the spindle motor by connecting the mass eccentricity vectors of the disks and the mass eccentricity vector of the disk spacer.

According to another aspect of the present invention, a hard disk drive includes: a pair of disks installed on a spindle having a center of rotation; and a ring-shaped disk spacer disposed between the pair of disks, the disk spacer having a mass eccentricity resulting from centers of an inner circle and of an outer circle being incongruous, the inner circle being defined by an inner circumferential surface of the disk spacer, the outer circle being defined by an outer circumferential surface of the disk spacer. Respective installation angles of the disks and of the disk spacer yield mass eccentricity vectors extending from the center of rotation of the spindle toward respective centers of gravity of each of the disks and of the disk spacer. A sum of the mass eccentricity vectors is less than a reference value at which a position error signal (PES) of sufficient quality is generated.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENT

Figure 1:
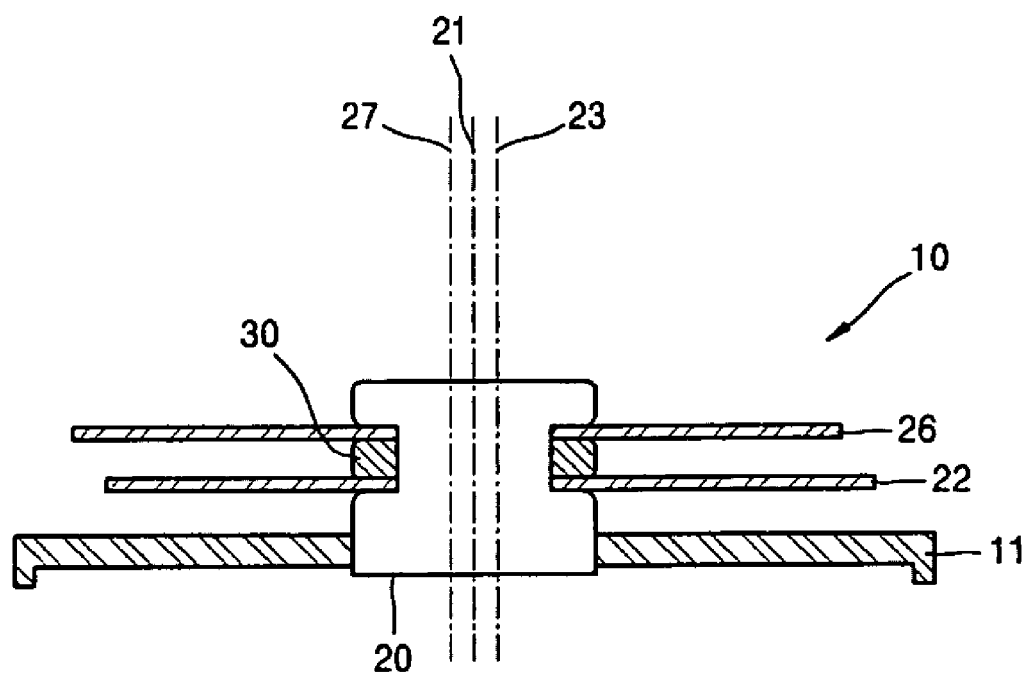
FIG. 1 is a cross-sectional view of the conventional hard disk drive.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 2:
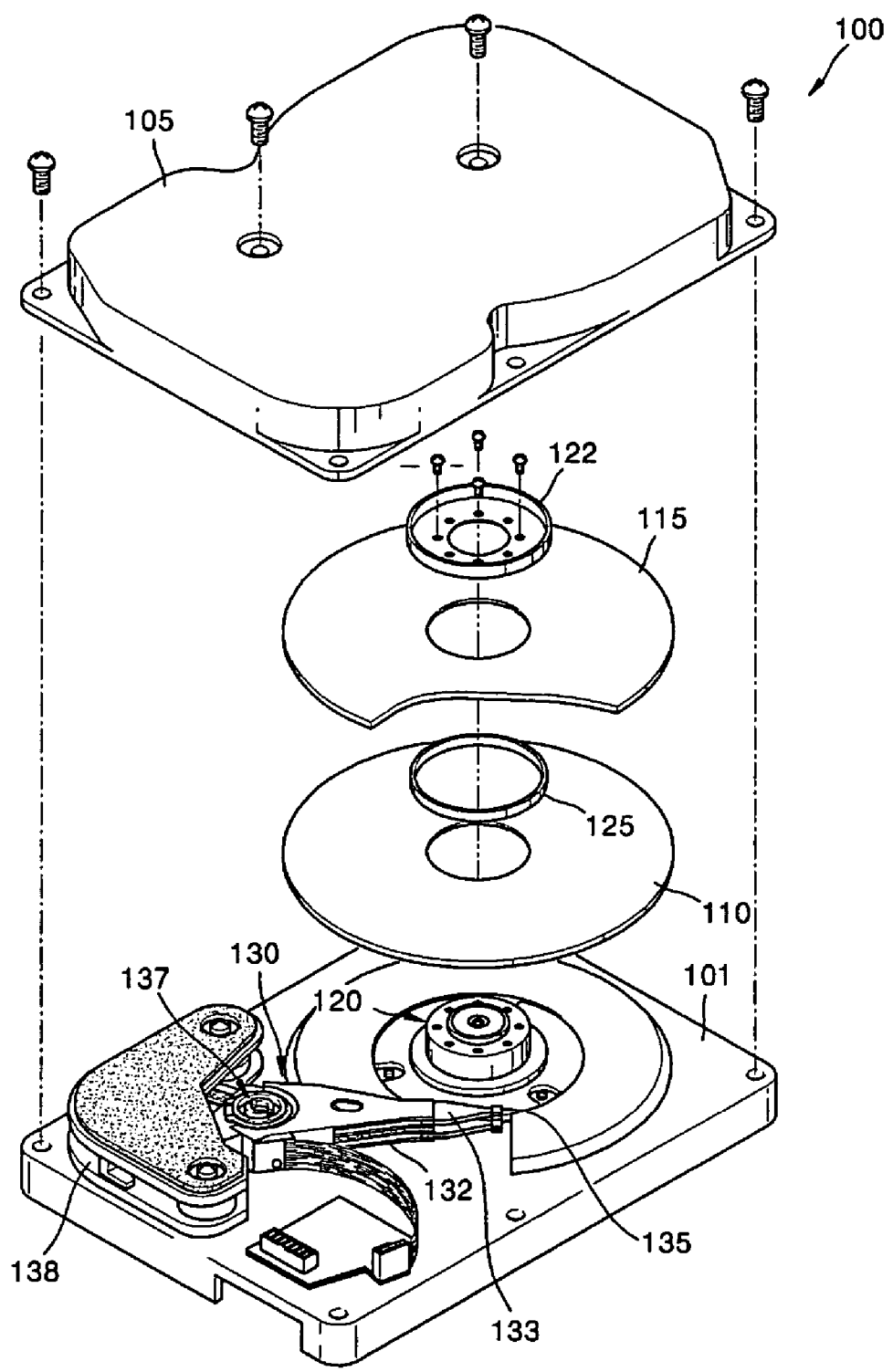
FIG. 2 is an exploded perspective view of a hard disk drive according to an embodiment of the present invention.

FIG. 2 is an exploded perspective view of a hard disk drive according to an embodiment of the present invention. Referring to FIG. 2, a hard disk drive 100 according to an embodiment of the present invention includes a housing having a predetermined inner space. The housing is formed by coupling a base member 101 and a cover member 105. Respective first and second disks 110 and 115, a spindle motor 120, and an actuator 130 are provided in the housing.

The housing includes the base member 101 which supports the spindle motor 120 and the actuator 130 and the cover member 105 which is coupled to the upper portion of the base member 101 and protects the first and second disks 110 and 115. The housing is typically manufactured of stainless steel or aluminum.

The first and second disks 110 and 115 are installed in the housing. Conventionally, four or more disks are installed at the hard disk drive to increase a data storage capacity. However, as the surface recording density of a disk increases, only one or two disks can store a sufficient amount of data. Thus, a hard disk drive having one or two disks has recently become common.

The first and second disks 110 and 115 are installed by being inserted around the spindle motor 120 installed on the base member 101. A disk spacer 125 having a ring shape to maintain a predetermined distance between the first and second disks 110 and 115 is interposed between the first and second disks 110 and 115. A disk clamp 122 is coupled to the upper portion of the spindle motor 120 so as to fix the first and second disks 110 and 115 and the disk spacer 125 to the spindle motor 120.

The actuator 130 is an apparatus to record data on the first and second disks 110 and 115 or reproduce data recorded thereon. The actuator 130 is installed on the base member 101 and is capable of pivoting. The actuator 130 includes a swing arm 132 capable of pivoting around a pivot bearing 137, a suspension 133 coupled to an end portion of the swing arm 132, and a slider 135 supported on the suspension 133. A magnetic head (not shown) for recording and reproduction of data is mounted on the slider 135. Also, the actuator 130 includes a voice coil motor (VCM) 138 which provides a pivot force to drive the swing arm 132. The voice coil motor 138 is controlled by a servo control system and rotates the swing arm 132 in a direction following the Fleming's left hand rule by the interaction of a magnetic field formed by current applied to a VCM coil (not shown) and a magnet. Accordingly, the slider 135 attached to the end portion of the suspension 133 moves across the first and second disks 110 and 115 (in a direction toward the spindle motor 120 or the outer circumference of the first and second disks 110 and 115).

Figure 3:
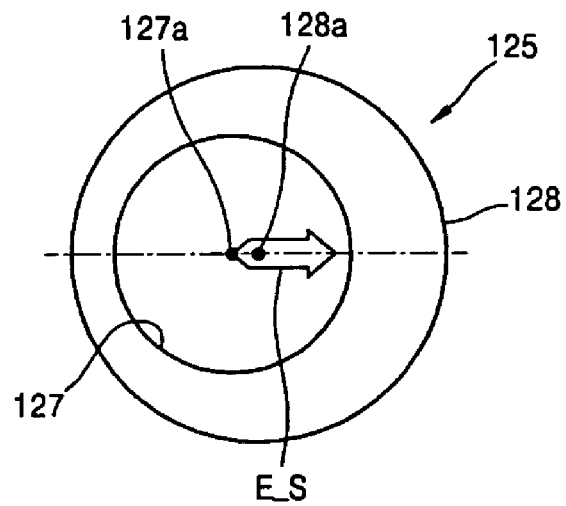
FIG. 3 is a plan view of the disk spacer of FIG. 2.

FIG. 3 is a plan view of the disk spacer of FIG. 2. In the present embodiment, the disk spacer 125 is designed to have mass eccentricity to reduce the eccentricity of the first and second disks 110 and 115. Referring to FIG. 3, the disk spacer 125 is designed such that the center 127a of an inner circle 127 defined by the inner circumferential surface of the disk spacer 125 is not congruous with the center 128a of an outer circle 128 defined by the outer circumferential surface thereof. In the disk spacer 125 according to the present embodiment, the center 128a of the outer circle 128 of the disk spacer 125 is deviated to the right compared to the center 127a of the inner circle. Thus, a mass eccentricity of "E_S" in the right direction is generated as indicated by an arrow in FIG. 3. The center of gravity (not shown) is located to be deviated to the right compared to the center 127a of the inner circle.

The mass eccentricity is defined by the multiplication of the eccentric mass deviated from the center of rotation by a distance from the center of rotation to the center of gravity of the eccentric mass. The mass eccentricity of the disk spacer 125 may be diversely provided according to the size and material of the disk spacer 125 and the distance between the center 127a of the inner circle and the center 128a of the outer circle. In the present embodiment, the disk spacer 125 applied to a 3.5 inch disk has the radius of the inner circle 127 of about 12.5 mm, the radius of the outer circle 128 of about 16 mm, and a thickness of about 2.4 mm.

The mass eccentricity of the disk spacer 125 increases as the distance between the center 127a of the inner circle and the center 128a of the outer circle increases. However, since both of the first ands second disks 110 and 115 provided in the hard disk drive 100 of FIG. 2 passed a quality test and have the mass eccentricity within allowance, the disk spacer 125 having an excessively large mass eccentricity of "E_S" is not needed for disk balancing. Therefore, the distance between the center 127a of the inner circle and the center 128a of the outer circle can be set within about 1 mm.

Figure 4:
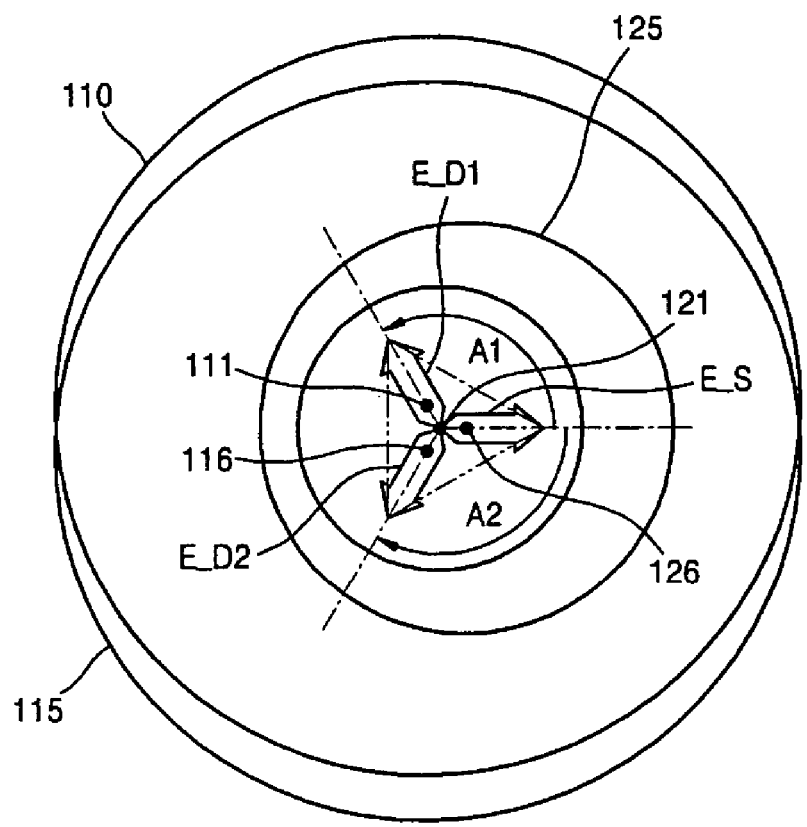
FIGS. 4 and 5 are views for explaining a disk balancing method according to an embodiment of the present invention.
Figure 5:
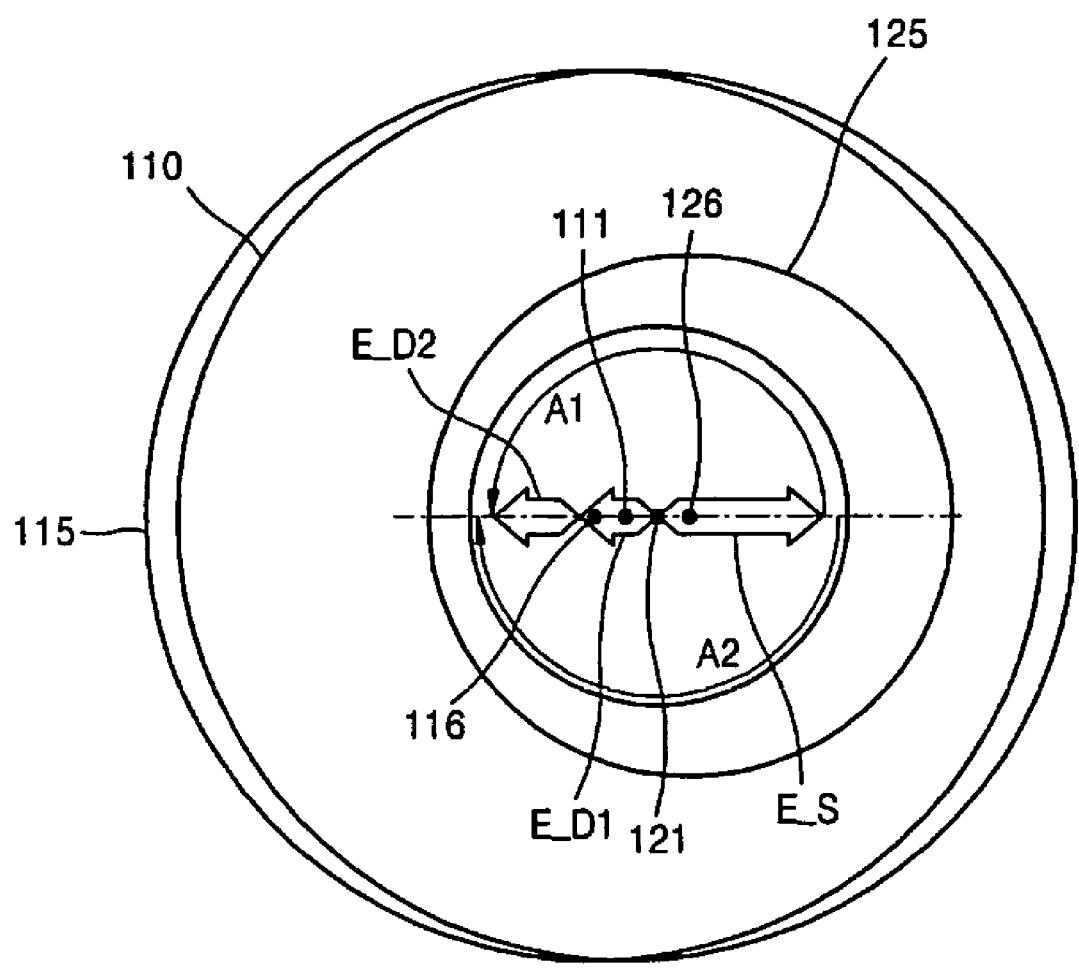

FIGS. 4 and 5 are views for explaining a disk balancing method according to an embodiment of the present invention. In the following description, a method of installing the first and second disks 110 and 115 and the disk spacer 125 on the spindle motor 120 with disk balancing is described with reference to FIGS. 2, 4, and 5. In FIGS. 4 and 5, a degree of eccentricity of the first and second disks 110 and 115 and the disk spacer 125 is exaggerated for the clear understanding of this embodiment of the present invention.

The first disk 110, the disk spacer 125, and the second disk 115 are sequentially installed on the spindle motor 120 and their positions are fixed by the disk clamp 122. The disk balancing is performed before the first and second disks 110 and 115 and the disk spacer 125 installed on the spindle motor 120 are fixed by the disk clamp 122.

It is assumed that, in the disk spacer 125 installed on the spindle motor 120, the center 127a of the inner circle shown in FIG. 3 is congruous with the rotational center 121 of the spindle motor 120. Thus, as shown in FIG. 3, the center of gravity 126 of the disk spacer 125 is deviated to one side from the rotational center 121 of the spindle motor 120 and the disk spacer 125 has a mass eccentricity vector "E—S" in the same direction. The first and second disks 110 and 115 installed on the spindle motor 120 do not have intentional mass eccentricity, unlike the disk spacer 125. However, the respective centers of gravity 111 and 116 of the first and second disks 110 and 115 do not generally match accurately the rotational center 121 of the spindle motor 121. The first and second disks 110 and 115 respectively have mass eccentricity vectors E_D1 and E_D2 in the same directions as the centers of gravity 111 and 116 within allowance.

Referring to FIG. 4, the disk balancing is performed by adjusting the respective installation angles A1 and A2 between the first and second disks 110 and 115 and the disk spacer 125 to form an imaginary triangle including the rotational center 121 of the spindle motor 120 by connecting the mass eccentricity vector E_D1 of the first disk 110, the mass eccentricity vector E_D2 of the second disk 115, and the mass eccentricity vector E_S of the disk spacer 125.

The installation angles A1 and A2 are adjusted such that the sum of the mass eccentricity vectors E_D1, E_D2, and E_S is within a reference value and preferably the vector sum is minimized. Since it is known that a possibility to cause a problem due to vibration and noise caused during the operation of the hard disk drive 100 of FIG. 2 is very low when the vector sum is within 100 cm·mg, the reference value is set to 100 cm·mg. If the mass eccentricity vectors E_D1, E_D2, and E_S are similar in the amount, the installation angles A1 and A2 are adjusted to 120° so that the vector sum is minimized.

When the mass eccentricity vector E_D1 of the first disk 110 and the mass eccentricity vector E_D2 of the second disk 115 are considerably smaller than the mass eccentricity vector E_S of the disk spacer 125, as shown in FIG. 5, the disk balancing is performed by adjusting the installation angles A1 and A2 between the first and second disks 110 and 115 and the disk spacer 125 to form an imaginary straight line passing the rotational center 121 of the spindle motor 120 by connecting the mass eccentricity vectors E_D1, E_D2, and E_S. At this time, the installation angles A1 and A2 each are 180°.

According to the above-described embodiment, unlike the conventional hard disk drive, since the disk spacer is used as an adjustable factor for disk balancing, more accurate disk balancing is possible. Thus, the problems due to the vibration and noise caused during the operation of the hard disk drive can be solved.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents. For example, the disk balancing method using an eccentric disk spacer according to the present invention can be applied to a hard disk drive having three or more disks and two or more disk spacers.

What is claimed is:

1. A disk spacer interposed between a pair of disks that are rotatably installed on a spindle motor and having a ring shape, wherein a center of an inner circle defined by an inner circumferential surface of the disk spacer is not congruous with a center of an outer circle defined by an outer circumferential surface thereof so as to produce a mass eccentricity of the disk spacer.

2. The disk spacer of claim 1, wherein a distance between the center of the inner circle and the center of the outer circle is less than about 1 mm.

3. A hard disk drive comprising:
a plurality of disks installed on a spindle motor and having a mass eccentricity within an allowed tolerance; and
at least a disk spacer interposed between neighboring ones of the plurality of disks,
wherein the disk spacer has a ring shape and a center of an inner circle defined by an inner circumferential surface of the disk spacer is not congruous with a center of an outer circle defined by an outer circumferential surface thereof to produce mass eccentricity in the disk spacer, and
wherein installation angles between the disks and the disk spacer are such that a vector sum of the mass eccentricity of the disks and the disk spacer is within a reference value with respect to a rotational center of the spindle motor.

4. The disk spacer of claim 3, wherein a distance between the center of the inner circle and the center of the outer circle is less than about 1 mm.

5. The disk spacer of claim 3, wherein the reference value of the mass eccentricity is 100 cm·mg.

6. The disk spacer of claim 3, wherein a pair of the disks and a disk spacer interposed there between are installed on the spindle motor and the installation angles between the disks and the disk spacer form a triangle surrounding a rotational center of the spindle motor by connecting mass eccentricity vectors of the disks and a mass eccentricity vector of the disk spacer.

7. The disk spacer of claim 3, wherein a pair of disks and a disk spacer interposed there between are installed on the spindle motor and the installation angles between the disks and the disk spacer form a straight line passing through a rotational center of the spindle motor by connecting mass eccentricity vectors of the disks and a mass eccentricity vector of the disk spacer.

8. A disk balancing method comprising:
installing a plurality of disks and at least one disk spacer on a spindle motor so that the disk spacer, which has a ring shape and is configured to have mass eccentricity as a center of an inner circle defined by an inner circumferential surface of the disk spacer is not congruous with a center of an outer circle defined by an outer circumferential surface thereof, is interposed between neighboring ones of the plurality of disks having mass eccentricity within an allowed tolerance, and
adjusting installation angles between the disks and the disk spacer such that a vector sum of a mass eccentricity of the disks and the disk spacer is within a reference value with respect to a rotational center of the spindle motor.

9. The method of claim 8, wherein a reference value of the mass eccentricity is 100 cm·mg.

10. The method of claim 8, wherein a pair of the disks and a disk spacer interposed therebetween are installed on the spindle motor and the installation angles between the disks and the disk spacer form a triangle surrounding a rotational center of the spindle motor by connecting the mass eccentricity vectors of the disks and the mass eccentricity vector of the disk spacer.

11. The method of claim 8, wherein a pair of the disks and a disk spacer interposed therebetween are installed on the spindle motor and the installation angles between the disks and the disk spacer form a straight line passing through a rotational center of the spindle motor by connecting the mass eccentricity vectors of the disks and the mass eccentricity vector of the disk spacer.

12. A hard disk drive comprising:
   a pair of disks installed on a spindle having a center of rotation; and
   a ring-shaped disk spacer disposed between the pair of disks, the disk spacer having a mass eccentricity resulting from centers of an inner circle and of an outer circle being incongruous, the inner circle being defined by an inner circumferential surface of the disk spacer, the outer circle being defined by an outer circumferential surface of the disk spacer,
   wherein respective installation angles of the disks and of the disk spacer yield mass eccentricity vectors extending from the center of rotation of the spindle toward respective centers of gravity of each of the disks and of the disk spacer, and
   wherein a sum of the mass eccentricity vectors is less than a reference value at which a position error signal (PES) of sufficient quality is generated.

13. The hard disk drive of claim 12, wherein the mass eccentricity vectors form a triangle surrounding the center of rotation of the spindle or a straight line passing through the rotational center of the spindle.

14. The hard disk drive of claim 12, wherein the sum is minimized.

* * * * *

UNITED STATES PATENT AND TRADEMARK OFFICE
CERTIFICATE OF CORRECTION

PATENT NO.        : 7,477,480 B2                                    Page 1 of 1
APPLICATION NO.   : 11/416135
DATED             : January 13, 2009
INVENTOR(S)       : Young-rok Oh It is certified that error appears in the above-identified patent and that said Letters Patent is hereby corrected as shown below:

Column 6, Line 36, change "there between" to --therebetween--.

Column 6, Line 43, change "there between" to --therebetween--.

Signed and Sealed this

Twenty-fourth Day of March, 2009

JOHN DOLL
*Acting Director of the United States Patent and Trademark Office*